(12) United States Patent
Osburn et al.

(10) Patent No.: US 6,792,489 B2
(45) Date of Patent: Sep. 14, 2004

(54) MULTISTAGE CONFIGURATION AND POWER SETTING

(75) Inventors: Edward P. Osburn, Folsom, CA (US); Gregory F. Taylor, Portland, OR (US); Ananda Sarangi, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 481 days.

(21) Appl. No.: 09/823,703

(22) Filed: Mar. 30, 2001

(65) Prior Publication Data

US 2002/0144036 A1 Oct. 3, 2002

(51) Int. Cl.[7] .......................... G06F 13/00; G06F 3/00; G06F 13/26; G06F 1/04; H05K 1/18

(52) U.S. Cl. ...................... 710/104; 710/266; 710/14; 713/500; 361/778

(58) Field of Search .................... 710/266, 104, 710/14; 713/500, 501, 600, 601; 361/778, 18

(56) References Cited

U.S. PATENT DOCUMENTS

| | | | |
|---|---|---|---|
| 5,630,090 A | 5/1997 | Keehn et al. | |
| 5,951,681 A | 9/1999 | Chang | |
| 6,059,191 A | * 5/2000 | Sedlak et al. | ................ 235/492 |
| 6,385,735 B1 | * 5/2002 | Wilson et al. | ............... 713/501 |
| 6,433,405 B1 | 8/2002 | Gunderson et al. | |
| 6,434,632 B1 | * 8/2002 | Hall | ........................... 710/14 |
| 6,449,170 B1 | * 9/2002 | Nguyen et al. | ............. 361/778 |

* cited by examiner

Primary Examiner—Tim Vo
(74) Attorney, Agent, or Firm—Blakely, Sokoloff, Taylor & Zafman LLP

(57) ABSTRACT

Multistage configuration and power setting for a processor includes an on-die configuration signal fuse block programmed during manufacturing, configuration signal Control and I/O circuitry, a configuration change control signal output indicating when the configuration signals are going to change, and voltage regulators and clock generators that rely on the configuration change control signal to begin the system configuration change and boot sequences. The processor actively drives its configuration signal states. Multistage configuration and power setting also enables the processor to change its configuration states during operation.

14 Claims, 14 Drawing Sheets

MULTISTAGE CONFIGURATION AND POWER SETTING

RELATED APPLICATIONS

The present application is related to U.S. Ser. No. 09/746, 168.

BACKGROUND OF THE INVENTION

1. Field of the Invention

The invention relates to the field of integrated circuit devices. More particularly, the invention relates to multistage configuration and power setting for processor chips.

2. Background Information

In a computer system, configuration signals, such as those that define voltage and bus clock frequency needed for proper operation of the system's processor, are set by hard wiring a set of pins located on the processor package or by providing a resistor pull up/down stuffing option. This means that when a configuration signal changes, the processor package has to change or the Bill of Materials and resistor population must change, respectively.

For example, designers typically develop and use a new package for each combination of configuration signals for a given processor. Having a new processor package for each combination of configuration signals is not desirable especially considering that configuration signals typically change several times during the processor's lifetime. If there are three different operating frequencies for a particular processor, engineers design three different processor packages to accommodate the three frequencies. Similarly, if there are three different operating voltages for a particular processor, engineers design three different processor packages to accommodate the three voltages. If there were three operating frequencies and three operating voltages for a particular processor, there would be nine different processor packages.

Having more than one package for a particular processor merely because a voltage or frequency changes generally causes logistics issues to arise during manufacturing of processor packages. There may be delays due to lead-time of the new package, for example. Having more than one package for a particular processor also generates a significant cost overhead. Not only do new packages have to be designed, but the new packages have to be maintained in inventory and be quality assured. This can be burdensome, time consuming, and uneconomical.

Using a resistor stuffing option, results in liability problems and possible reliability problems resulting from illegal alteration to the stuffing configuration. Processor re-markers may alter the configuration stuffing options to increase operational frequency and stability in order to illegally resell the product as a higher performance product than it was designed for. This may lead to reduced product reliability and inherent stability problems resulting from operating the part out of specifications.

Another approach beginning to be implemented is the use of a "Dynamic Processor Configuration and Power-up" circuit, as described in U.S. Ser. No. 09/746,168 to Sarangi et al., where the platform power planes must sequence properly to ensure the configurations signals, driven by fuses on the die, are valid. The power sequencing can result in added cost and complexity to the design. Additionally, the settings are static and cannot be changed during operation

BRIEF DESCRIPTION OF THE DRAWINGS

In the drawings, like reference numbers generally indicate identical, functionally similar, and/or structurally equivalent elements. The drawing in which an element first appears is indicated by the leftmost digit(s) in the reference number, in which.

DETAILED DESCRIPTION OF THE ILLUSTRATED EMBODIMENTS

A system and corresponding method for multistage configuration and power setting of a processor integrated circuit is described in detail herein. Various aspects of the invention are described as well. However, it will be apparent to those skilled in the art that the invention may be practiced with only some or all aspects of the invention. For purposes of explanation, specific numbers, methods, materials and configurations are set forth in order to provide a thorough understanding of the invention. However, it will also be apparent to one skilled in the art that the invention may be practiced without the specific details. In other instances, well-known features are omitted or simplified in order not to obscure the invention.

Some parts of the description will be presented using terms such as particular signals, voltages, voltage regulators, processors, clock generators, and so forth, commonly employed by those skilled in the art to convey the substance of their work to others skilled in the art. Other parts of the description will be presented in terms of operations performed by a computer system, using terms such as accessing, determining, counting, transmitting, and so forth. As is well understood by those skilled in the art, these quantities and operations take the form of electrical, magnetic, or optical signals capable of being stored, transferred, combined, and otherwise manipulated through mechanical and electrical components of a computer system; and the term "computer system" includes general purpose as well as special purpose data processing machines, systems, and the like, that are standalone, adjunct or embedded.

Various operations will be described as multiple discrete steps performed in turn in a manner that is most helpful in understanding the invention. However, the order in which they are described should not be construed to imply that these operations are necessarily order dependent or that the operations be performed in the order in which the steps are presented.

The invention is described below in further detail with respect to several examples for illustration. Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
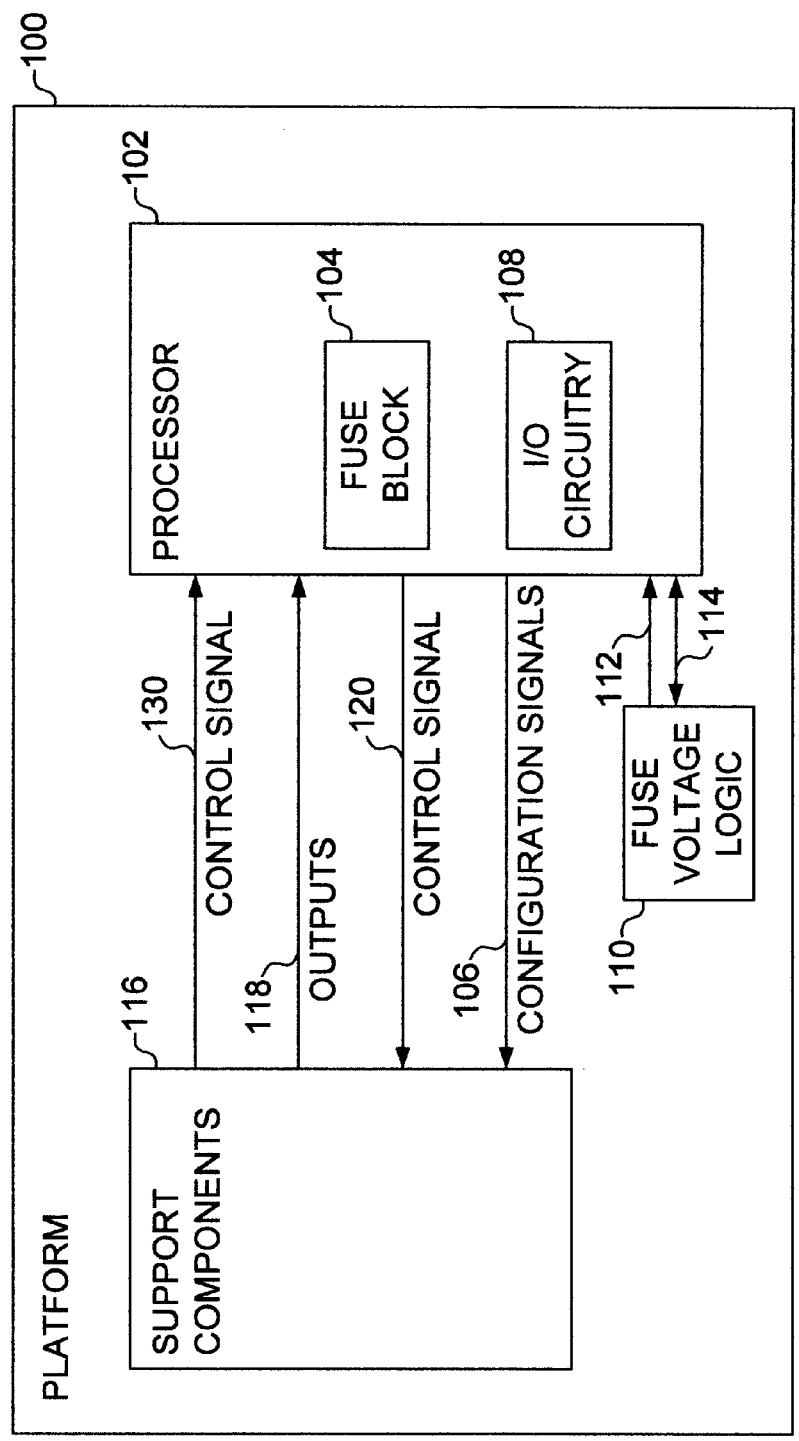
FIG. 1 is a block diagram of a computer platform suitable for implementing embodiments of the present invention.

FIG. 1 is a high-level block diagram of a platform 100 suitable for implementing an embodiment of the present invention. The platform 100 is typically a computer platform that supports a high-performance desktop, a workstation, a server, etc. In one embodiment, the platform 100 is a UNIX platform. In other embodiments, the platform 100 may be Windows® or Windows® NT platform. Those skilled in the art will appreciate that a variety of platforms may be used when implementing the present invention.

The platform 100 includes a processor 102, which performs its conventional functions of executing programming instructions including implementing many of the teachings of the present invention. The processor 102 can be a processor of the Pentium® processor family available from Intel Corporation of Santa Clara, Calif., but might be any processor which utilizes configuration signals, such as for voltage and clock frequency determination.

The processor 102 includes front-end logic to receive a control signal value to inhibit boot up normal of the processor 102 in response to receiving power. As is well known, when a processor is "booting," "boots up," performs a "normal boot process," etc., the processor determines the devices that are connected to it (e.g., printers, facsimiles, etc.), the operating system that is running on the platform (e.g., Linux, Windows®, etc.), and the software programs installed on the platform (e.g., Microsoft® Word, WordPerfect®, etc.). Aspects of the present invention permit the use of fuses that require power to be read and to be used to configure the power supply voltage of the processor that contains the fuses.

In one embodiment, the processor 102 has on-die a fuse block 104. The fuse block 104 includes programmable fuses, which can be programmed during manufacturing of the processor 102. In one embodiment, one or more configuration signal states 106 are programmed into the fuse block 104 during manufacturing the processor 102's die. Each configuration state specifies an output to be generated by support components (described more fully below). For example, one configuration state may specify a primary voltage and its associated secondary configuration states may specify several secondary voltages to be generated. Another configuration state may specify a primary frequency and its associated secondary configuration states may specify several secondary frequencies to be generated. An advantage of this feature is that the same package can be used for a variety of configuration signals, a variety of configuration states, and a variety of platform 100 configurations by changing, for example, voltages and frequencies. There does not need to be a different processor package for each set of configuration states. The result is fewer processor packages over the lifetime of the processor. Programming the fuse block 104 is accomplished using any well-known technique.

The processor also may have input/output (I/O) circuitry 108 powered by an I/O voltage plane (not shown). The I/O circuitry 108 includes buffers, drivers, etc., to actively drive the programmed configuration states. In one embodiment, the I/O circuitry 108 provides the supply voltage to the fuse block 104. This enables the fuse block 104 to drive the values on the configuration signals 106 (or configuration states).

In one embodiment, the platform 100 has a fuse voltage logic 110, which generates a fuse voltage 112 to power the fuse block 104, which drives the values on the configuration signals 106. In this embodiment, a signal 114 may be provided to the processor 102 to indicate that the fuse voltage 112 is valid and stable. The signal 114 also may be used to control initial driving of the values on the configuration signals 106.

One feature of the present invention enables programming of the states of the configuration signals 106 during processor 102 manufacturing, applying default configuration states during platform 100 power-up, and dynamically altering configuration states during platform 100 operation. In one embodiment, when the processor 102 is initially powered up, the processor 102 uses default configuration settings to configure the platform 100. The processor 102 then uses the configuration states programmed in the fuse block 104. Either the I/O circuitry 108 power supply or the fuse voltage logic 110 powers the fuse block 104. The output values of the I/O circuitry 108 power supply or the fuse voltage logic 110 are set according to the default configuration settings. The processor 102 drives the new configuration states specified by the fuse block 104 to support components 116. The support components 116 generate outputs 118 according to the configuration states they receive from the processor 102.

A control signal 120 state is used to provide proper timing and control between the processor 102 and support components 116. The control signal 120 state indicates to the support components 116 that the configuration of the platform 100 will be changing. In one embodiment, the outputs 118 change dynamically when the processor 102 drives the new configuration states during assertion of the control signal 120 state. In another embodiment, the support components 116 latch the new configuration states on the falling edge of control signal 120 state. For handshaking and stability purposes the support components 116 may provide a control signal 130 back to the processor 102 to ensure the processor 102 that the outputs 118 based on the new configuration settings are valid and stable.

Once powered up, the processor 102 may use the control signal 120 state and any handshaking signals, such as the control signal 130, to change configuration settings during operation.

Figure 2:
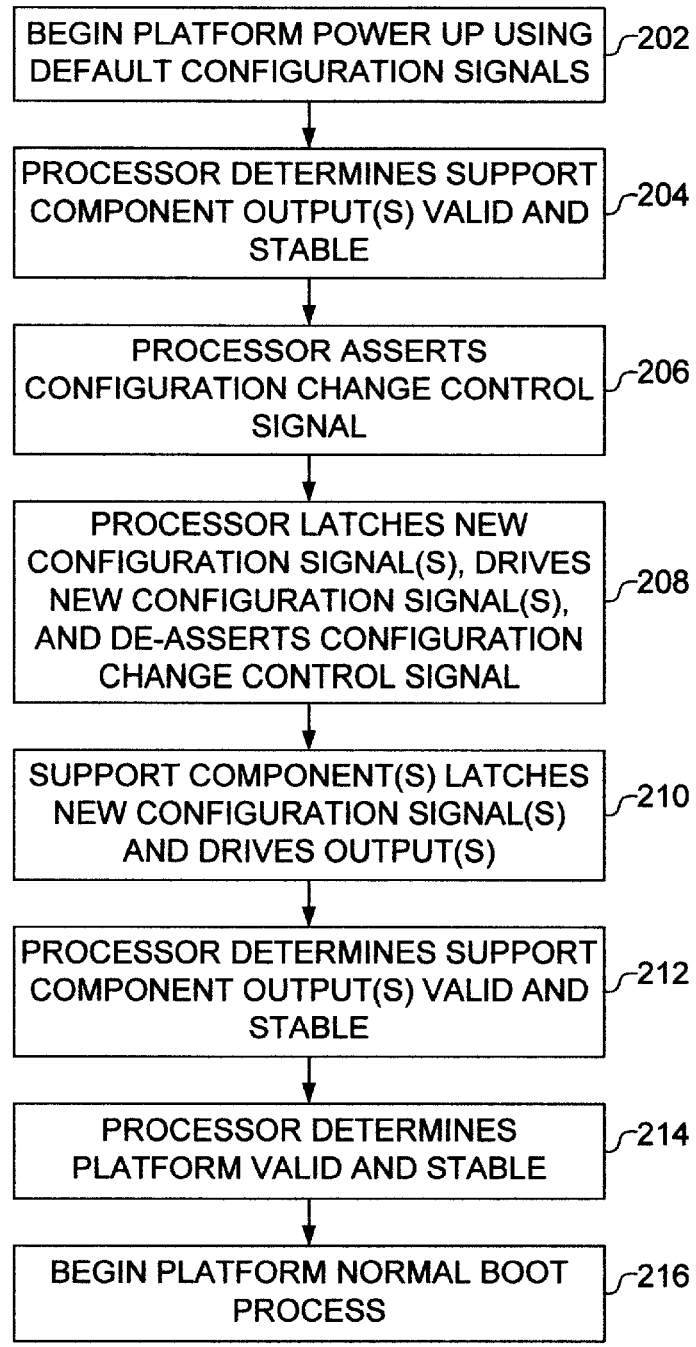
FIG. 2 shows a flowchart of an approach to implementing several embodiments of the present invention on the computer platform shown in FIG. 1.

FIG. 2 shows a flowchart of a method 200 illustrating an approach to implementing several embodiments of the present invention on the platform 100. Operation of the method 200 begins with step 202, in which the platform 100 begins to power up using default configuration states. This typically occurs when the platform 100 receives a signal to cause the platform 100's power supply to turn on. In one embodiment, a "power-ON" signal is generated by hardware and/or software in the platform 100. For example, a power-ON signal may be generated by operating an ON-OFF button, switch, etc., on the platform 100. In any event, the power-ON signal is active upon platform 100 power up.

In step 204, the processor 102 determines that the fuse voltage 112 is valid and stable. In step 206, the processor 102 asserts the (configuration change) control signal 120 state. In step 208, the processor 102 read the new configuration states from the fuse block 104, drives the new configurations signals 106 to the support components 116, and de-asserts the control signal 120 state. In step 210, the support components 116 latch the new configuration states and drive the outputs 118. In step 212, the processor 102 determines that the outputs 118 are valid and stable. In step 214, the processor 102 senses that the platform 100 is valid and stable. In step 216, the platform 100 begins a normal boot process.

Figure 3:
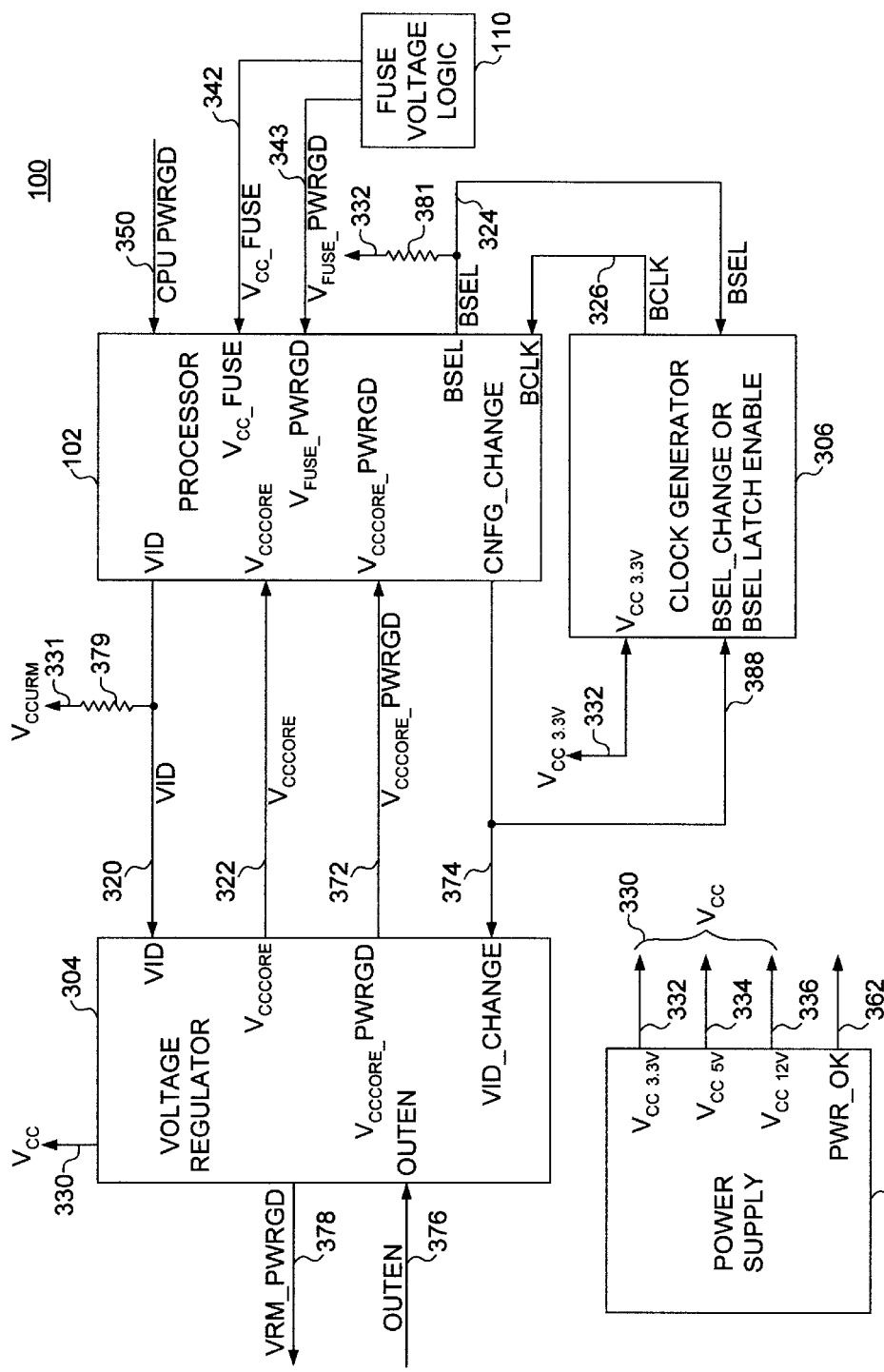
FIG. 3 is a is a block diagram of the computer platform of FIG. 1 in more detail.

FIG. 3 is a block diagram of the example platform 100 in more detail, which includes the processor 102, a voltage generator 304, a clock generator 306, and a power supply 308.

The processor 102 is typically packaged on a well-known flip chip pin grid array (FC-PGA) or plastic pin grid array (PPGA) that uses a well-known PGA 370 socket for installation into a motherboard (not shown). (As is well known, a motherboard combines processors and chipsets (or logic) to form a subsystem of a computer platform.) The PGA 370 socket includes 370 pins, many of which are dedicated to configuration signals, clock signals, signals that indicate whether voltages are valid and stable, control signals, voltage planes, voltages, and so forth, and connects the signals and voltages between the processor 102's die and the PGA 370 connector.

In one embodiment of the present invention, there may be several pins on the processor 102's package for receiving the voltage required to properly operate the processor 102's core and for specifying the voltage required to properly operate the processor 102's core. For example, a value for a voltage identification configuration signal (VID 320) appears on one or more pins to specify the voltage required for proper operation of the processor 102's core and a core voltage ($V_{CCCORE}$ 322) appears on one or more pins to receive the voltage to properly operate the processor 102's core.

Conventionally, the pins for VID 320 are not signals, but are either open circuits or short circuits to ground such that the combination of opens and shorts defines VID 320. According to aspects of the present invention, one or more VID 320 states are programmed into the processor 102's fuse block during manufacturing, and may be four bits wide, five bits wide, etc. The processor 102 drives VID 320. The voltage regulator 304 reads VID 320 and generates $V_{CCCORE}$ 322, which can be 1.5 volts, 3.2 volts, etc. $V_{CCCORE}$ 322 also may power on-die caches. In one embodiment, VID 320 has a default value (e.g., 11111), which is used to determine the default value of $V_{CCCORE}$ 322 during initial platform 100 power up. Thereafter, the processor 102 may dynamically change the value of VID 320.

In one embodiment of the present invention, there may be one or more pins on the processor 102's package for receiving the clock required to properly operate the platform 100 and for specifying the frequency required to properly operate the platform 100. For example, a value for a system bus frequency select configuration signal (BSEL 324) appears on one or more pins to specify the frequency required for proper operation of the platform 100 and a system bus clock (or front side bus frequency) (BCLK 326) appears on a pin(s) to receive the frequency at which to properly operate the platform 100.

Conventionally, the pins for BSEL 324 are not signals, but are either open circuits or short circuits to ground such that the combination of opens and shorts defines BSEL 324. According to aspects of the present invention, one or more BSEL 324 states are programmed into the processor 102's fuse block during manufacturing, and the signal may be two bits wide, five bits wide, etc. The processor 102 drives BSEL 324. The clock generator 306 reads BSEL 324 and generates BCLK 326. BCLK 326 may supply the processor 102, the platform 100 chipsets, etc. The processor 102 uses BCLK 326 to generate the processor 102's core frequency, which typically is a multiple of BCLK 326. In one embodiment, BCLK 326 is one hundred megahertz (MHz). In other embodiments, BCLK 326 can be 200 MHz, 133 MHz, 66 MHz, etc.

In one embodiment of the present invention, there may be one or more pins on the processor 102's package for receiving a supply voltage ($V_{CCCORE}$ 322), which is generated by the voltage regulator 304. The voltage regulator 304 generates the supply voltage ($V_{CCCORE}$ 322) for the processor 102 from the power supply 308 input supply voltage 330. Because different circuits and/or components within the platform 100 may operate at different voltages, there are usually several supply voltages available from the power supply 308. In one embodiment, "$V_{CC3.3V}$ 332" refers to a 3.3 volt supply voltage for the platform 100, "$V_{CC5V}$ 334" refers to a five-volt supply voltage for the platform 100, and "$V_{CC12V}$ 336" refers to a twelve-volt supply voltage for the platform 100. The power supply 308 also generates a signal (PWR-OK 362) that indicates to the platform 100's processor board that the voltages supplied by the power supply 308 are stable and within their specifications.

There also may be one or more pins on the processor 102's package for receiving a signal (CPU PWRGD 350) to indicate that the clocks and power supplies for the platform 100 are stable and within their specifications. For example, CPU PWRGD 350 indicates when BCLK 326 and $V_{CCCORE}$ 322 are valid and stable on the processor 102.

The voltage regulator 304 also generates a "$V_{CCCORE\_PWRGD}$ 372" signal, which indicates that $V_{CCCORE}$ 322 is stable and valid according to VID 320 and controls when the platform 100 can begin a normal boot process. $V_{CCCORE\_PWRGD}$ 372 also indicates that the processor 102 may change states or again change the value of VID 320. In one embodiment, $V_{CCCORE\_PWRGD}$ 372 is an active high signal.

The voltage regulator 304 can be a direct current-to-direct current (DC-to-DC) voltage converter powered by $V_{CC3.3V}$ 332, $V_{CC5V}$ 334, or $V_{CC12V}$ 336. The voltage regulator 304 in one embodiment is a circuit on the processor 102's board with the necessary complement of external capacitance. In an alternative embodiment, the voltage regulator 304 is a plug-in module with the necessary complement of capacitance and possibly capacitance on the processor 102's board to ensure proper voltages and currents.

An "OUTEN 376" signal enables and disables the output voltage(s) from the voltage regulator 304. Once enabled, the voltage regulator 304 generates a "VRM_PWRGD 378" signal, which indicates that voltage(s) and current(s) generated by the voltage regulator 304 are stable and within their specifications. $VRM_{13}$ PWRGD 378 is sent from the voltage regulator 304 to the motherboard logic to generate CPU PWRGD 350. The OUTEN signal 376 is generated by motherboard logic.

In one embodiment, a processor fuse voltage "$V_{CC}$_FUSE 342" powers the fuse block 104. $V_{CC}$_FUSE 342 may be generated by the I/O circuitry 108 power supply. Alternatively, when the fuse block is powered by the fuse voltage logic 110, the fuse voltage logic 110 generates $V_{CC}$_FUSE 342. Additionally, when the fuse block is powered by the fuse voltage logic 110 a "$V_{FUSE\_PWRGD}$ 343" signal may be used to control initial configuration signal delivery. In an embodiment, $V_{FUSE\_PWRGD}$ 343 is active high. In one embodiment, logic on the processor 102's motherboard generates $V_{FUSE\_PWRGD}$ 343 and ANDs $V_{FUSE\_PWRGD}$ 343 with $V_{CCCORE\_PWRGD}$ 372 to deliver $V_{CCCORE\_PWRGD}$ 372 to the processor 102. In an alternative embodiment, there are separate processor 102 inputs for $V_{FUSE\_PWRGD}$ 343 and $V_{CCCORE\_PWRGD}$ 372, and logic to AND $V_{FUSE\_PWRGD}$ 343 with $V_{CCCORE\_PWRGD}$ 372 is internal to the processor 102.

In one embodiment, the processor 102 generates a configuration change control signal "CNFG_change 374," which indicates when the configuration states will be changing. The support components may either change dynamically when the new configuration states are driven during CNFG_change assertion or they may latch the new configuration states on the falling edge of CNFG_change 374. In one embodiment, CNFG_change 374 is active high.

According to one embodiment, the clock generator 306 is powered by $V_{CC3.3V}$ 332 and is controlled by CNFG_change 374, which enables and disables sampling of BSEL 324. Once enabled, the clock generator 306 can read BSEL 324 and generate BCLK 326. As FIG. 3 shows, in one embodiment, CNFG_change 374 signals to the clock generator 306 that the processor 102 is dynamically changing the value of BSEL 324 or that the clock generator 306 may latch the new BSEL 324 on the falling edge of CNFG_change 374 (BSEL_change or BSEL_Latch Enable 388). Clock generators suitable for implementing the clock generator 306 are well known and can be single ended or differential.

In one embodiment, CNFG_change 374 indicates to the voltage regulator 304 that that the processor 102 is dynamically changing the value of VID 320 or that the voltage regulator 304 may latch the new VID 320 on the falling edge of CNFG_change 374 (VID_change 374).

The platform 300 also includes a resistor 379 and a resistor(s) 381. The resistor 379 is coupled to pull up VID 320 to a voltage regulator 304-controlled voltage ($V_{CCVRM}$ 331). This configuration eliminates power-sequencing issues between the processor 102 and the voltage regulator 304. For example, if VID) 320 were pulled up to $V_{CC3.3V}$ 332 and $V_{CCVRM}$ 331 became stable and valid before $V_{CC3.3V}$ 332 became stable and valid, $V_{CCCORE\_PWRGD}$ 372 would appear to be stable and valid even though the voltage on the VID 320 was not stable and valid. If the VID 320 pullupis not stable and valid, the processor 102 cannot properly drive the VID 320. Pulling VID 320up to $V_{CCVRM}$ 331 with the resistor 379 ensures that $V_{CCCORE\_PWRGD}$ 372 does not become stable and valid until the voltage regulator 304 has power and VID 320 is pulled up to a valid level. In one embodiment, the resistor 379 is one thousand ohms.

The resistor 381 is coupled to pull up BSEL 324 to $V_{CC3.3V}$ 332, which is the power supply for the clock generator 306, to prevent power sequencing problems between the clock generator 306 and BSEL_change or BSEL_Latch Enable 388. If BSEL 324 was pulled up to another voltage that lagged BSEL_change or BSEL_Latch Enable 388 and the clock generator 306 power supply ($V_{CC3.3V}$ 332), then the BSEL 324 signal may not be valid. If the BSEL 324 signal is not valid, an incorrect BSEL 324 may be read by the clock generator 306. In one embodiment resistor 381 is a 330 ohm resistor.

Figure 4:
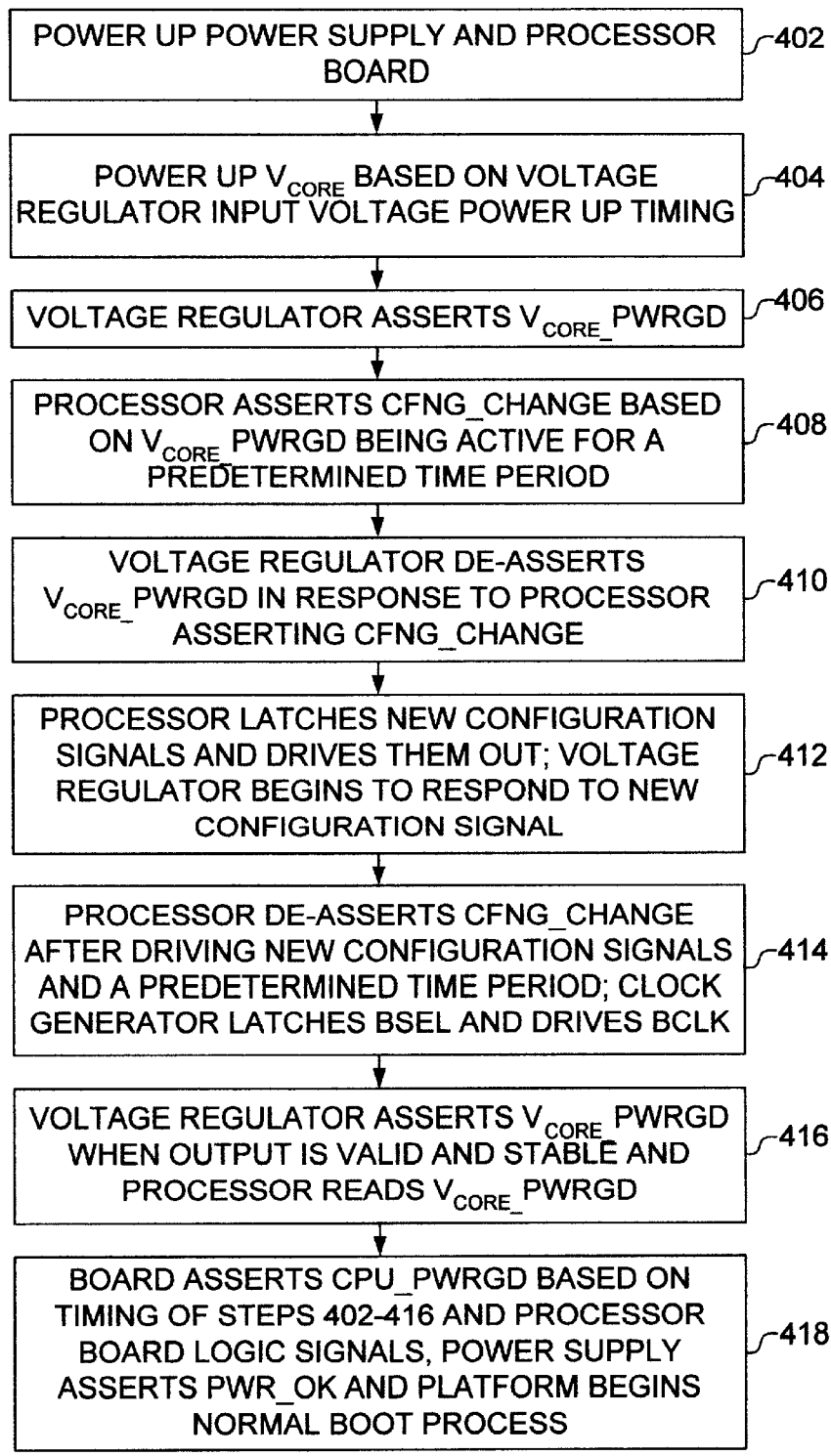
FIG. 4 shows a flowchart of an exemplar power up sequence in which the fuse block in FIG. 1 receives fuse voltage from the input/output (I/O) circuitry and support components do not latch configuration states.

FIG. 4 shows a flowchart of an exemplar power up sequence 400 in which the fuse block 104 receives $V_{CC\_FUSE}$ 342 from the I/O circuitry 108 and the voltage regulator 304 does not latch VID 320. According to this exemplar, initial default $V_{CCCORE}$ 322 powers the fuse block 104 for alteration of the configuration states and the processor 102 is prevented from asserting CNFG_change 374 until the voltage regulator 304 drives $V_{CCCORE\_PWRGD}$ 372 active. The clock generator 306 latches BSEL 324 signals on the falling edge of CNFG_change 374. Latching occurs before the clock generator 306 begins driving BCLK 326.

The power up sequence 400 beings with step 402, in which the power supply 308 and processor 102 motherboard power up. In step 404, the voltage generator 304 powers up $V_{CCCORE}$ 322. Power up may be dependent upon $V_{CC}$ 330 power up timing. In step 406, the voltage regulator 304 asserts $V_{CCCORE\_PWRGD}$ 372 active.

In step 408, the processor 102 asserts CNFG_change 374 after $V_{CCCORE\_PWRGD}$ 372 has been active for a predetermined time period. In step 410, the voltage regulator 304 de-asserts $V_{CCCORE\_PWRGD}$ 372 in response to the processor 102 asserting CNFG_change 374. This handshaking between the processor 102 and the voltage regulator 304 tells the voltage regulator 304 that the processor is about to change configuration states.

In step 412, the processor 102 reads the new value for the configuration states from the fuse block 104 and drives them to the voltage regulator 304 (VID 320) and the clock generator 306 (BSEL 324). The voltage regulator 304 begins to respond to the new value for VID 320 and generate the new value for $V_{CCCORE}$ 322.

In step 414, the processor 102 de-asserts CNFG_change 374 after CNFG_change 374 has been active for a predetermined time period. The clock generator 306 latches BSEL 324 and begins to generate the new value for BCLK 326.

In step 416, the voltage regulator 304 asserts $V_{CCCORE\_PWRGD}$ 372 in response to the new values for VID 320 and generating $V_{CCCORE}$ 322 according to the new values for VID 320. The processor 102 reads $V_{CCCORE\_PWRGD}$ 372.

In step 418, the processor motherboard logic asserts CPU PWRGD 350. The assertion of CPU PWRGD 350 depends upon the timing of steps 402 through 416, inclusive, and processor 102 motherboard logic signals. The power supply 308 asserts PWR_OK 362 and the platform 100 begins a normal boot process.

Figure 5:
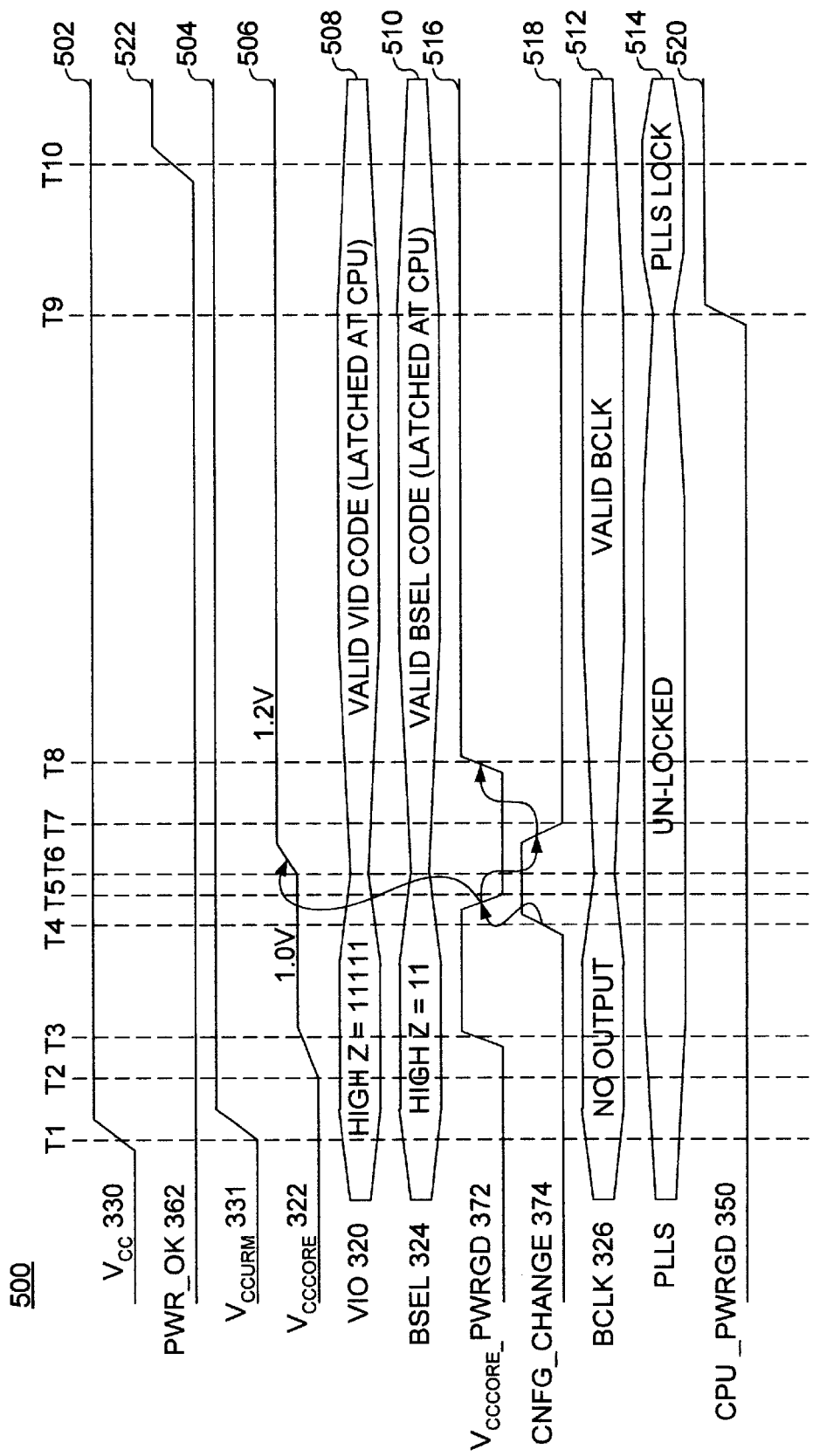
FIG. 5 shows timing of signal states and power supplies in the platform shown in FIG. 3 as the platform powers up according to the embodiment shown in the flowchart of FIG. 4.

FIG. 5 shows a timing sequence 500 for signals and power supplies in the platform 100 as the platform 100 powers up according to the embodiment shown in the power sequence 400. Between time T1 and time T2, the power supply 308 generates $V_{CC}$ 330, which supplies the voltage regulator 304. $V_{CC}$ 330 and $V_{CCVRM}$ 331 become valid and stable. VID 320 and BSEL 324 approach the default levels, e.g., 11111 and 11, respectively. $V_{CCVRM}$ 331 reaches its appropriate value to pull up VID 320. PWR_OK 362 and CPU PWRGD 350 are de-asserted. There is no BCLK 326 output from the clock generator 306. The processor 102's phase locked loop is unlocked. The PLL is a well-known processor circuit used in conjunction with the processor 102's clock. CNFG_change 374 is de-asserted. $V_{CCCORE\_PWRGD}$ 372 is de-asserted, which prevents the platform 100 from beginning a normal boot process.

Between time T2 and time T3, VID 320 and BSEL 324 are at the default levels, e.g., 11111 and 11, respectively. $V_{CCCORE}$ 322 approaches the values specified by the default level for VID 320.

Between time T3 and time T4, $V_{CCCORE}$ 322 is valid and stable at the values specified by the default level for VID 320 (e.g., one volt). $V_{CCCORE\_PWRGD}$ 372 is asserted and remains asserted for a predetermined time period.

Between time T4, time T5, and time T6, CNFG_change 374 is asserted, which causes $V_{CCCORE\_PWRGD}$ 372 to be de-asserted. The new values for VID 320 and BSEL 324 are beginning to be driven by the processor 102. $V_{CCCORE}$ 322 approaches the values specified by the (power-up) programmed configuration signal for VID 320. BCLK 326 approaches the values specified by the (power-up) programmed configuration signal for BSEL 324.

Between time T6 and time T7, $V_{CCCORE}$ 322 begins to change to the output level specified by the (power-up) programmed configuration signal for VID 320 (e.g., 1.2 volts). CNFG_change 374 remains asserted. At time T7, CNFG_change 374 is de-asserted. At time T8, $V_{CCCORE\_PWRGD}$ 372 is asserted. Between time T8 and time T9, $V_{CCCORE}$ 322 is valid and stable and BCLK 326 becomes valid and stable.

Between time T9 and time T10, the processor 102's PLLs lock and the platform 100 asserts CPU PWRGD 350. At time T10, the power supply 308 asserts PWR_OK 362 and the platform 100 begins a normal boot process.

In the embodiment shown in FIG. 5, a timing diagram 502 indicates the timing of $V_{CC}$ 330. A timing diagram 504 indicates the timing of $V_{CCVRM}$ 331. A timing diagram 506 indicates the timing of $V_{CCCORE}$ 322. Timing diagrams 508 and 510 indicates the timing of VID 320 and BSEL 324, respectively. A timing diagram 512 indicates the timing of BCLK 326. A timing diagram 514 indicates the timing of the processor 102's internal PLL. A timing diagram 516 indicates the timing of $V_{CCCORE\_PWRGD}$ 372 A timing diagram 518 indicates the timing of CNFG_change 374. A timing diagram 520 indicates the timing of CPU PWRGD 350. A timing diagram 522 indicates the timing of PWR_OK 362.

Figure 6:
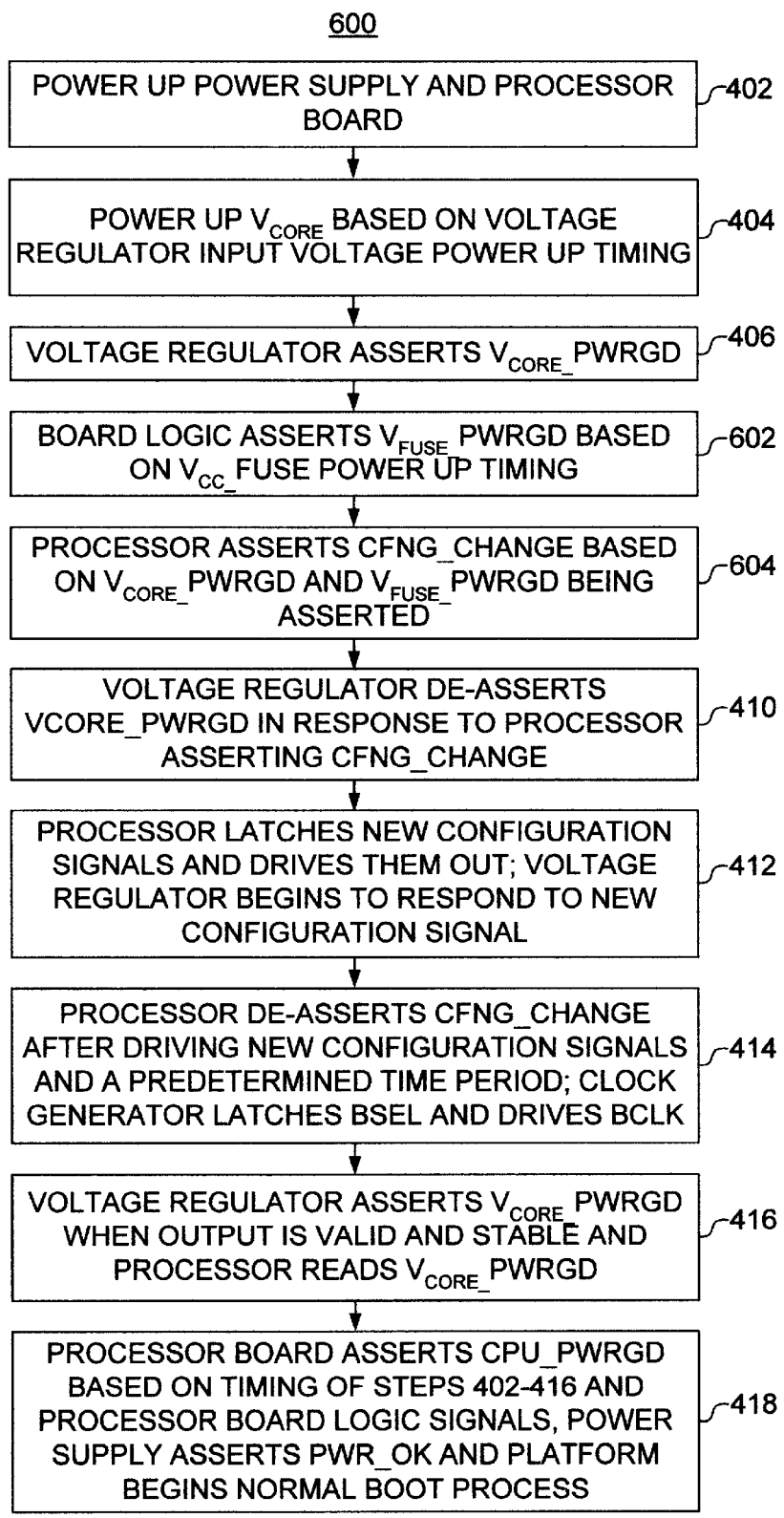
FIG. 6 shows a flowchart of an exemplar power up sequence in which the fuse block in FIG. 1 receives fuse voltage from an external fuse voltage power supply and support components do not latch configuration states.

FIG. 6 shows a flowchart of an exemplar power up sequence 600 in which the fuse block in FIG. 1 receives $V_{CC}$_FUSE 342 from the fuse voltage logic 110 and the support components 116 do not latch configuration states. According to this exemplar, $V_{FUSE\_PWRGD}$ 343 acts as an enable signal/pin for passing $V_{CCCORE\_PWRGD}$ 372 through the logic that allows the processor to latch the VID 320 fuses in the fuse block 104. The delay in delivery of $V_{CC}$_FUSE 342 from the fuse voltage logic 110 to the fuse block 104 may shift timing from time T4 forward. In one embodiment, the clock generator 306 latches BSEL 324 on the falling edge of CNFG_change 374.

The sequence 600 performs steps 402, 404, and 406 from the sequence 400. The sequence 600 performs step 602, in which the motherboard logic asserts $V_{FUSE\_PWRGD}$ 343. Power up may be dependent upon $V_{CC}$_FUSE 342 power up timing. The sequence 600 performs step 604, in which processor 102 asserts CNFG_change 374, which may be dependent upon $V_{CCCORE\_PWRGD}$ 372 and $V_{FUSE\_PWRGD}$ 343 both being asserted. The sequence 600 performs steps 410, 412, 414, 416, and 418 from the sequence 400.

Figure 7:
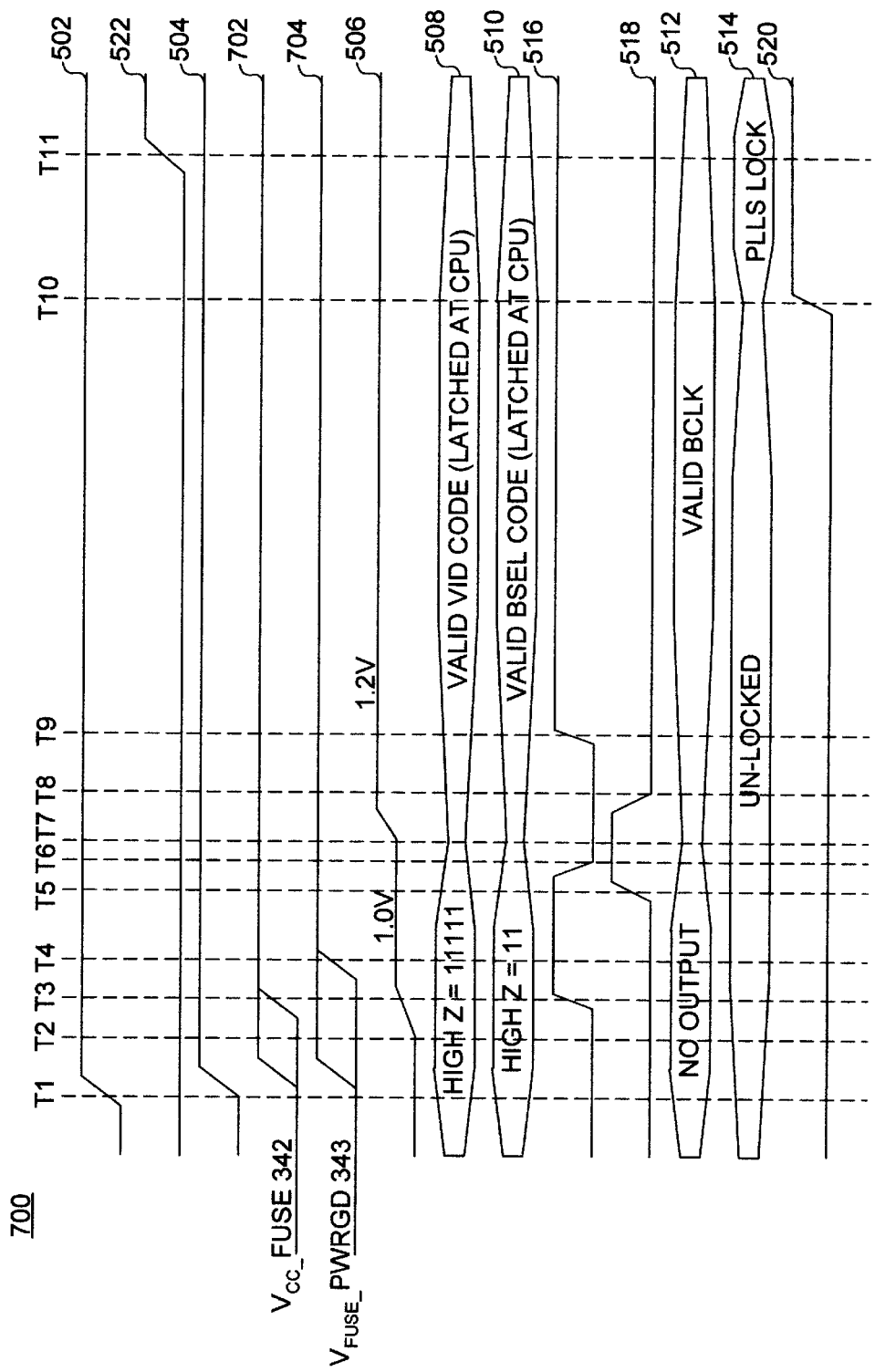
FIG. 7 shows timing of states and power supplies in the platform shown in FIG. 3 as the platform powers up according to the embodiment shown in the flowchart of FIG. 6.

FIG. 7 shows a timing sequence 700 for signals and power supplies in the platform 100 as the platform 100 powers up according to the embodiment shown in the sequence 600.

The timing diagram 700 is similar to the timing diagram 500 with some exceptions. For example, a timing diagram 702 indicates the timing of $V_{CC}$_FUSE 342 and a timing diagram 704 indicates the timing of $V_{FUSE\_PWRGD}$ 343.

Figure 8:
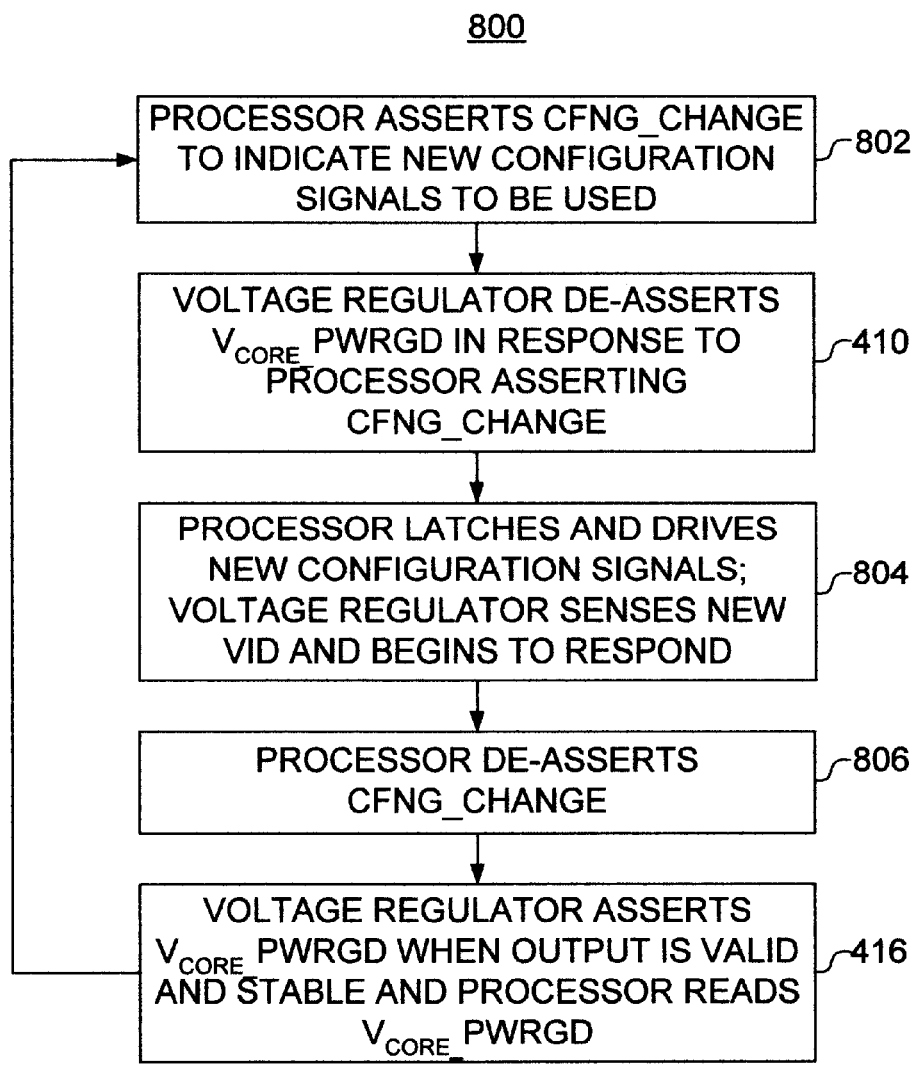
FIG. 8 shows a flowchart of an exemplar operational configuration change sequence in which the fuse block in FIG. 1 receives fuse voltage from the input/output (I/O) circuitry or from an external fuse voltage power supply and support components do not latch configuration states.

FIG. 8 shows a flowchart of an exemplar operational configuration change sequence 800 in which the fuse block 104 receives $V_{CC}$_FUSE 342 from the I/O circuitry 108 or from the fuse voltage logic 110 and the voltage regulator 304 does not latch VID 320. According to this exemplar, the processor 102 drives CNFG_change 374 to "soft start" the voltage regulator 304 to a new voltage level. The processor 102 latches and drives the new code for VID 320. The voltage regulator 304 begins to respond and when its output is valid and stable, drives $V_{CCCORE\_PWRGD}$ 372 back to the processor 102.

In one embodiment, the processor 102 begins "thermal throttling," which is a well known power saving technique whereby the processor 102's internal clock frequency is changed in response to temperature of the processor 102. Additionally, the processor 102 core voltage $V_{CCCORE}$ 322 may also be changed to increase the power savings. In this embodiment, the processor 102 uses the sequence 800 to alter $V_{CCCORE}$ 322 and then uses $V_{CCCORE\_PWRGD}$ 372 to lock the internal clocks to a new frequency and begin operation at the new frequency during thermal throttle.

In another embodiment, the processor 102 is "undocked" from an external power supply (e.g., unplugged from a power supply socket) and becomes powered from an internal battery source, which causes the processor 102 to reduce its internal clock frequency. The processor 102 changes VID 320 to change $V_{CCCORE}$ 322 to complement the new internal operating frequency.

Before the processor 102 executes the sequence 800, the platform 100 is powered and running, typically following the execution of step 418. The sequence 800 performs step 802, in which the processor 102 asserts CNFG_change 374 to indicate new configuration states to be used. The sequence 800 performs step 410 from the sequence 400. The sequence 800 performs step 804, in which the processor 102 latches new configuration states and drives them. The voltage regulator 304 senses new values for VID 320 and begins to respond. In step 806, the processor 102 de-asserts CNFG_change 374. The sequence 800 performs step 416 from the sequence 400. The sequence 800 repeats as needed to alter VID 320 during operation of the platform 100.

Figure 9:
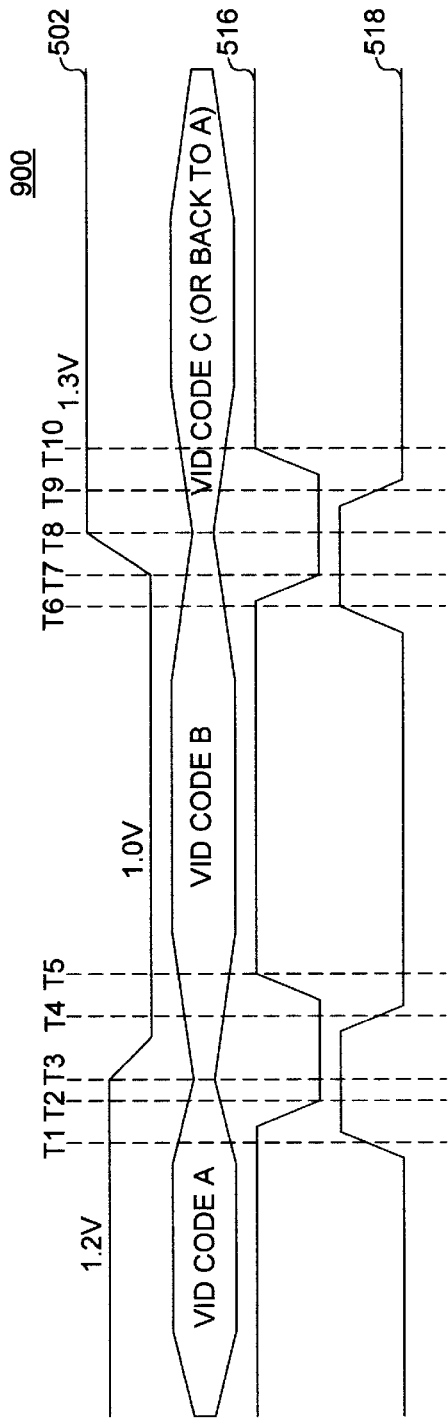
FIG. 9 shows timing of signal states and power supplies in the platform shown in FIG. 3 as the platform changes configuration states according to the embodiment shown in the flowchart of FIG. 8.

FIG. 9 shows a timing sequence 900 for timing of signal states and power supplies in the platform 100 as the platform 100 changes VID 320 according to the sequence 800. Before time T1 and time T2, $V_{CCCORE}$ 332, VID 320 is valid and stable (e.g., at 1.2 volts), CNFG_change 374 is de-asserted, $V_{CCCORE\_PWRGD}$ 372 is asserted, and the platform 100 has completed a normal boot process and is running. Between time T1 and time T2, CNFG_change 374 is asserted, which causes $V_{CCCORE\_PWRGD}$ 372 to be de-asserted. At time T3 the processor 102 latches and drives VID 320. Between time T3 and T4, $V_{CCCORE}$ 332 begins changing (e.g., to 1.0 volts). At time T4, $V_{CCCORE}$ 332 begins to stabilize (e.g., at 1.0 volts) and CNFG_change 374 is de-asserted. At time T5, $V_{CCCORE}$ 332 is valid and stable at its new value and $V_{CCCORE\_PWRGD}$ 372 is asserted. Between times T5 and T6, the processor 102 and platform 100 operate as required. At time T6 through time T10, the processor 102 may again change VID 320 and the voltage regulator will generate a new $V_{CCCORE}$ 332, which may or may not be the same $V_{CCCORE}$ 332 as at time T1 or T5.

Figure 10:
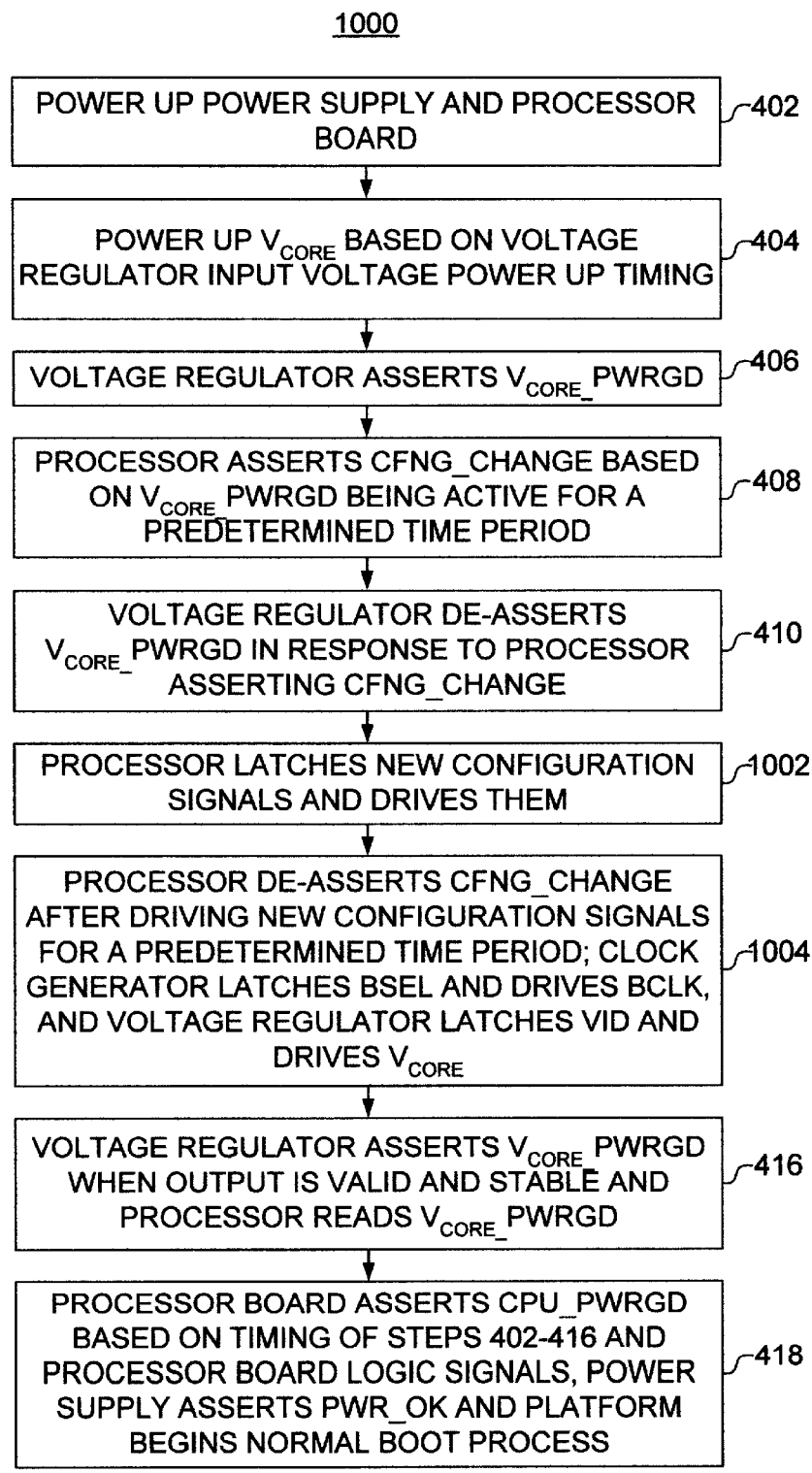
FIG. 10 shows a flowchart of an exemplar power up sequence in which the fuse block in FIG. 1 receives fuse voltage from the input/output (I/O) circuitry and support components latch configuration states.

FIG. 10 shows a flowchart of an exemplar power up sequence 1000 in which the fuse block 104 receives $V_{CC\_}$FUSE 342 from the I/O circuitry 108 and the support components 116 (e.g., the voltage regulator 304) latch configuration states. According to this exemplar, initial default $V_{CCCORE}$ 322 powers the fuse block 104 for alteration of the configuration states and the processor 102 is prevented from asserting CNFG_change 374 until the voltage regulator 304 drives $V_{CCCORE\_PWRGD}$ 372 active. The clock generator 306 latches BSEL 324 and the voltage regulator 304 latches the new VID 320 on the falling edge of CNFG_change 374. Latching of BSEL 324 occurs before the clock generator 306 begins driving BCLK 326.

The sequence 1000 performs steps 402, 404, 406, 408, and 410 from the sequence 400. In step 1002, the processor 102 latches the new configuration states (e.g., for VID 320 and BSEL 324) and drives them out. In step 1004, the processor 102 de-asserts CNFG_change 374 after driving the new configuration states for a predetermined period of time. The voltage regulator 304 latches VID 320 and begins to respond. The clock generator 306 latches BSEL 324 and begins to drive BCLK 326. The sequence 1000 performs steps 416, and 418 from the sequence 400.

Figure 11:
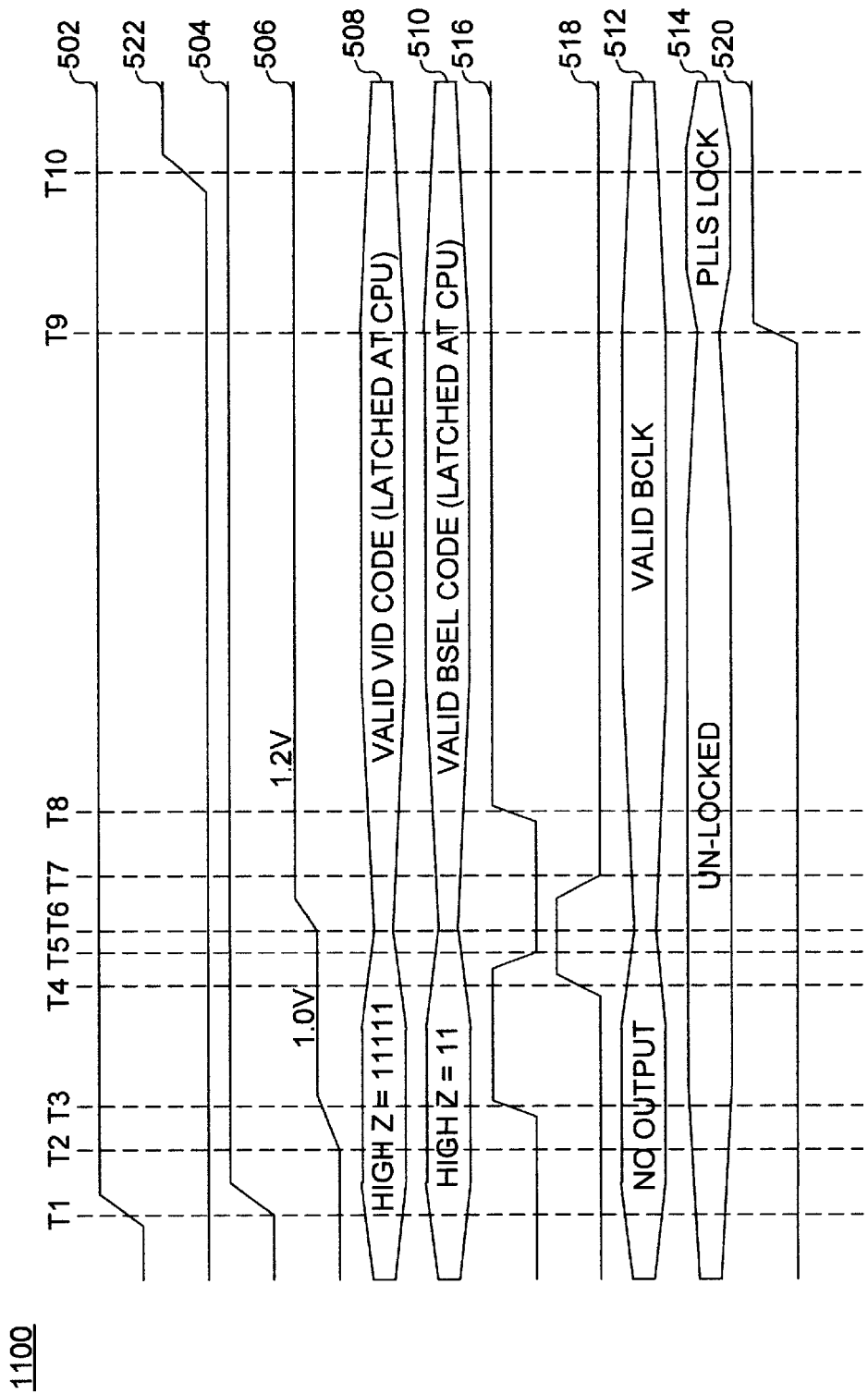
FIG. 11 shows timing of signal states and power supplies in the platform shown in FIG. 3 as the platform powers up according to the embodiment shown in the flowchart of FIG. 10.

FIG. 11 shows a timing sequence 1100 for signals and power supplies in the platform 100 as the platform 100 powers up according to the sequence 1000, which is the same or substantially similar to the sequence 500.

Figure 12:
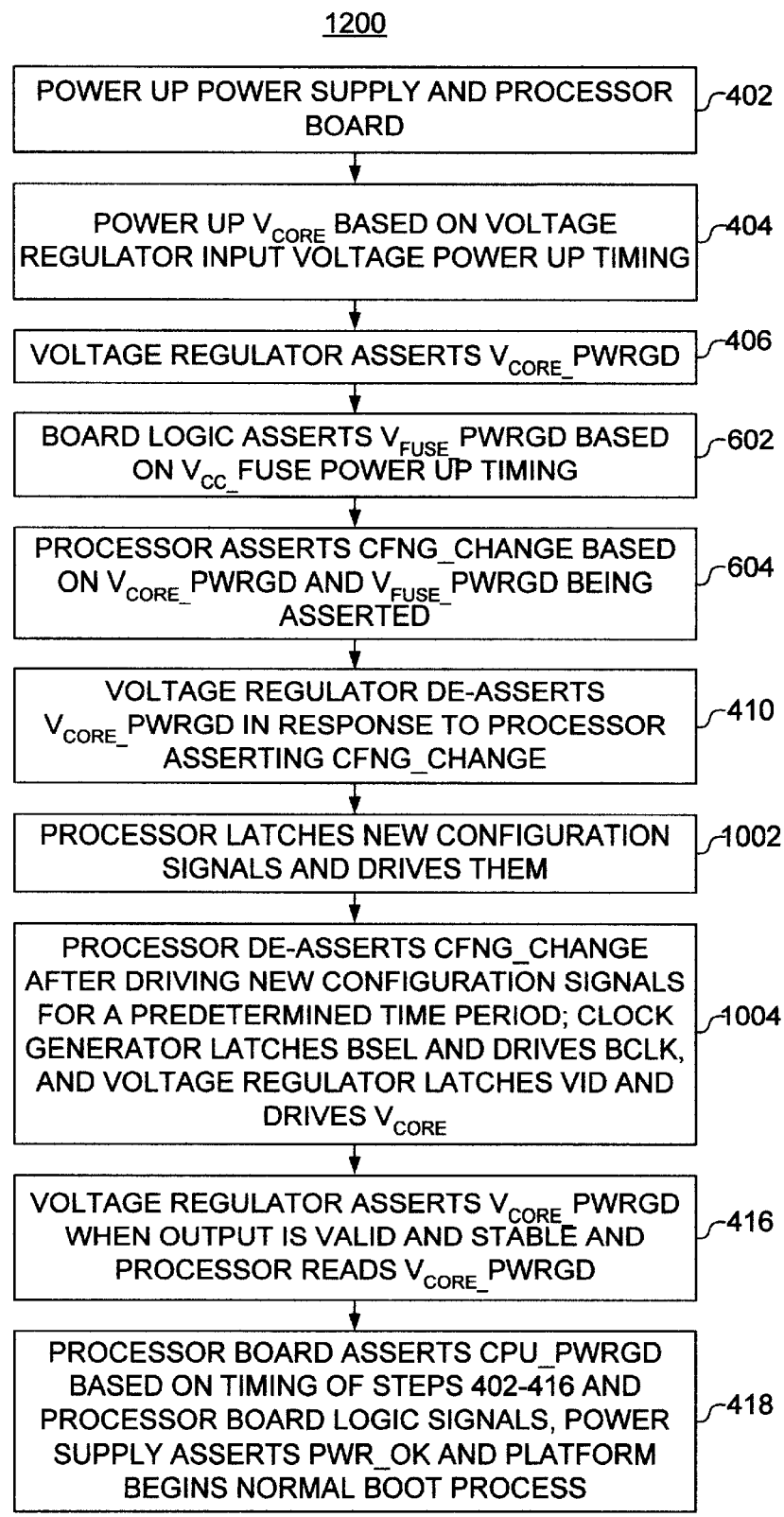
FIG. 12 shows a flowchart of an exemplar power up sequence in which the fuse block in FIG. 1 receives fuse voltage from an external fuse voltage power supply and support components latch configuration states.

FIG. 12 shows a flowchart of an exemplar power up sequence 1200 in which the fuse block 104 receives $V_{CC\_}$FUSE 342 from the fuse voltage logic 110 and the voltage regulator 304) latches VID 320. According to this exemplar, $V_{FUSE\_PWRGD}$ 343 acts as an enable signal/pin for passing $V_{CCCORE\_PWRGD}$ 372 through the logic that allows the processor to latch the VID 320 fuses in the fuse block 104. The delay in delivery of $V_{CC\_}$FUSE 342 from the fuse voltage logic 110 to the fuse block 104 may shift timing from time T4 forward. In one embodiment, the clock generator 306 latches BSEL 324 and the voltage regulator 304 latches VID 320 on the falling edge of CNFG_change 374. The sequence 1200 performs steps 402, 404, and 406 from the sequence 400, steps 602 and 604 from the sequence 6000, steps 1002 and 1004 from the sequence 1000, and steps 416, and 418 from the sequence 400.

Figure 13:
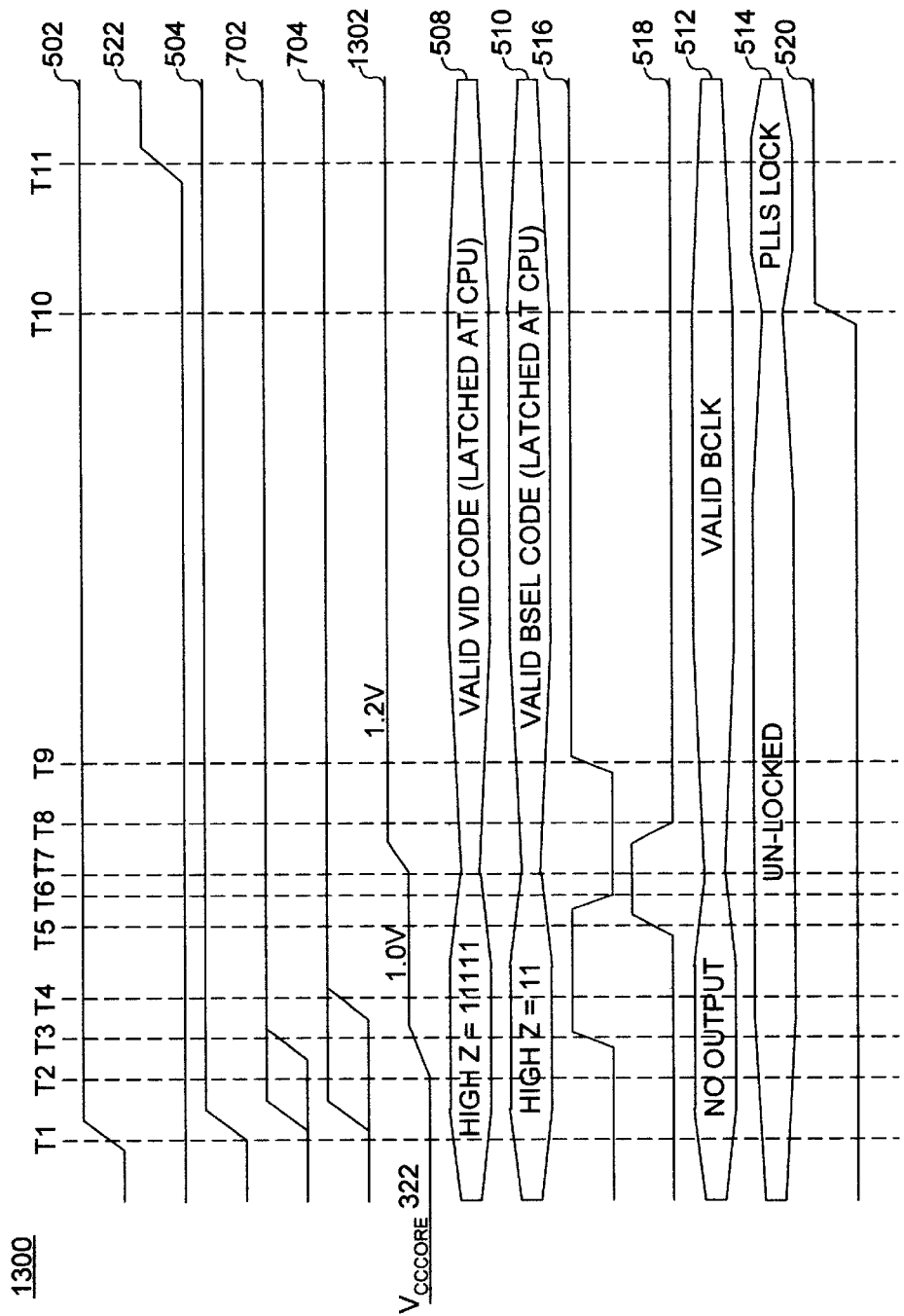
FIG. 13 shows timing of signal states and power supplies in the platform shown in FIG. 3 as the platform powers up according to the embodiment shown in the flowchart of FIG. 12.

FIG. 13 shows a timing sequence 1300 for signals and power supplies in the platform 100 as the platform 100 powers up according to the power sequence 1200, which is the same or substantially similar to the sequence 500 with some exceptions. For example, a timing diagram 1302 shows that the voltage regulator 304 output $V_{CCCORE}$ 322 does not begin to respond to the new VID 320 until the voltage regulator 304 latches the new VID 320 on the falling edge of CNFG_change 374 at time T8.

Figure 14:
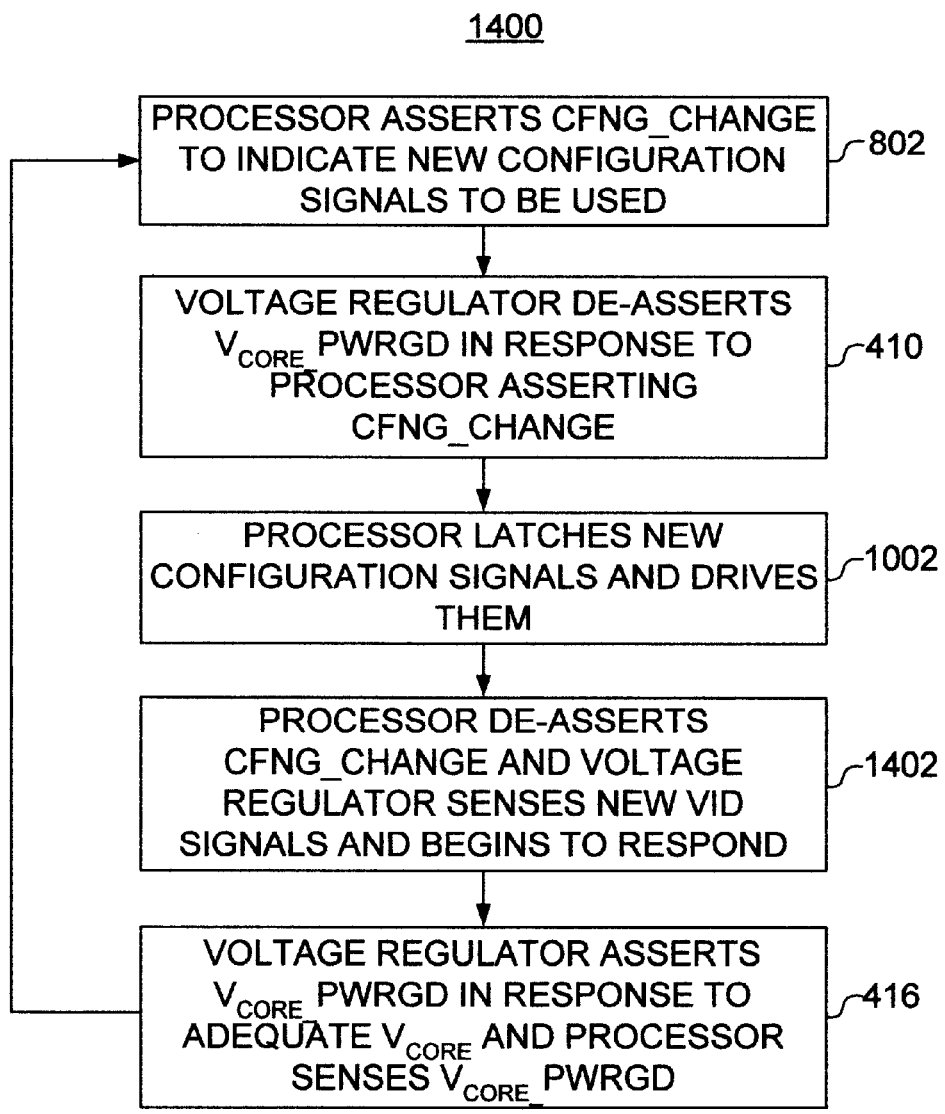
FIG. 14 shows a flowchart of an exemplar operational configuration change sequence in which the fuse block in FIG. 1 receives fuse voltage from the input/output (I/O) circuitry or from an external fuse voltage power supply and support components latch configuration states.

FIG. 14 shows a flowchart of an exemplar operational configuration change sequence 1400 in which the fuse block 104 receives $V_{CC\_}$FUSE 342 from the I/O circuitry 108 or from the fuse voltage logic 110 and the voltage regulator 304 latches VID 320. The sequence 1400 performs step 802 from the sequence 800, step 410 from the sequence 400, and the step 1002 from the sequence 1000. In step 1402, the processor 102 de-asserts CNFG_change 374. Then the voltage regulator 304 latches the new VID 320 and begins to respond. The sequence 1400 performs step 416 form the sequence 400. The sequence 1400 repeats as needed to alter VID 320 during operation of the platform 100.

Figure 15:
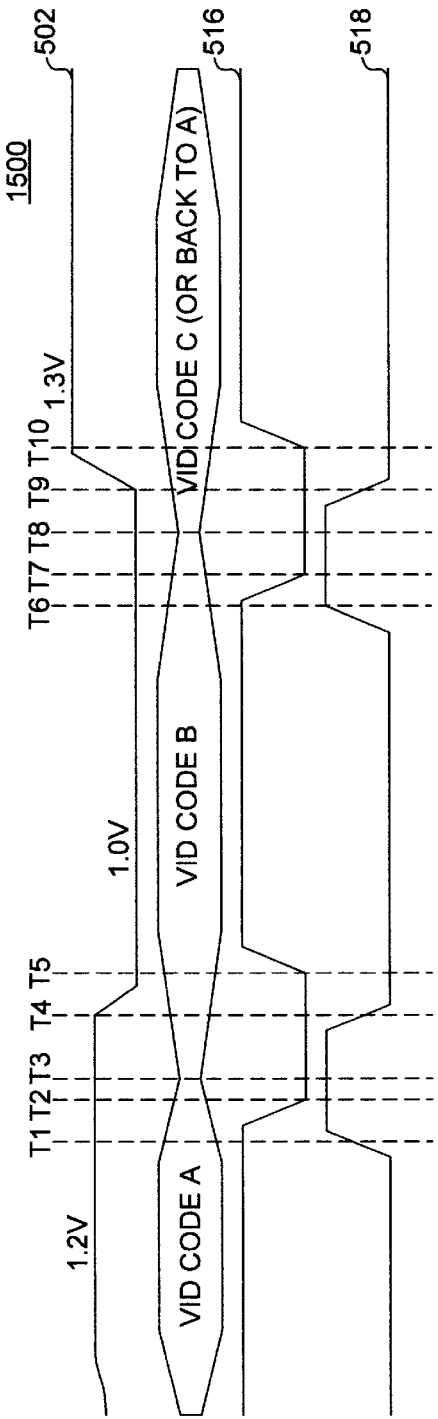
FIG. 15 shows timing of signal states and power supplies in the platform shown in FIG. 3 as the platform changes configuration states according to the embodiment shown in the flowchart of FIG. 14.

FIG. 15 shows a timing sequence 1500 for signals and power supplies in the platform 100 as the platform 100 powers up according to the embodiment shown in the sequence 1400. Note that VID 320 can be changed more than once during operation of the platform 100.

While aspects of the present invention are described with reference to configuration signals such as a voltage identification configuration signal and a system bus frequency configuration signal, the present invention applies to any configuration signal that may be present in computer platforms. For example, the present invention applies to current configuration signals, other voltage and frequency configuration signals, etc.

Aspects of the invention can be implemented using hardware, software, or a combination of hardware and software. Such implementations include state machines, application specific integrated circuits (ASICs), field programmable gate arrays, (FPGA), etc. In implementations using software, the software may be stored on a computer program product (such as an optical disk, a magnetic disk, a floppy disk, etc.) or a program storage device (such as an optical disk drive, a magnetic disk drive, a floppy disk drive, etc.).

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A system, comprising:
   a processor having a fuse block programmed with at least two configuration signal states for one configuration signal; and
   logic coupled to the processor to receive one of the at least two configuration signal states, to output to the processor a value based on the received configuration signal state, to dynamically receive during operation of the system a second one of the at least two configuration signal states, and to output to the processor a second value based on the second received configuration signal state.

2. The system of claim 1, wherein the configuration signal is a voltage identification configuration signal.

3. The system of claim 1, wherein the configuration signal is a frequency selection configuration signal.

4. The system of claim 1, further comprising a configuration change control signal to indicate which one of the at least two configuration signal states is received by the logic.

5. The system of claim 1, wherein the logic comprises a clock generator.

6. The system of claim 1, wherein the logic comprises a voltage regulator.

7. The system of claim 1, wherein the logic is further to receive a second one of the at least two configuration signal states and to output to the processor a second value based on the second received configuration signal state during power up but prior to normal booting of the system.

8. The system of claim 1, wherein the logic is further to receive a third one of the at least two configuration signal states and to output to the processor a third value based on the third received configuration signal state after normal booting of the system.

9. The system of claim 2, wherein the value is a processor core voltage.

10. The system of claim 3, wherein the value is a clock frequency.

11. The system of claim 7, wherein the logic is further to receive a third one of the at least two configuration signal states and to output to the processor a third value based on the third received configuration signal state after normal booting of the system.

12. An article of manufacture, comprising:
a machine-readable medium having stored thereon instructions for causing a machine to:
receive one of at least two configuration signal states, the configuration signal states being programmed in a processor fuse block, the configuration signal states being for one configuration signal;
output to the processor a value based on the determined configuration signal state;
dynamically receive during operation of the machine a second one of the at least two configuration signal states, and to output to the processor a second value based on the second received configuration signal state.

13. The article of manufacture of claim 12, wherein the machine-readable medium is further to receive the configuration signal state for a voltage identification configuration signal.

14. The article of manufacture of claim 12, wherein the machine-readable medium is further to receive the configuration signal state for a frequency select configuration signal.

* * * * *

UNITED STATES PATENT AND TRADEMARK OFFICE
CERTIFICATE OF CORRECTION

PATENT NO. : 6,792,489 B2
DATED : September 14, 2004
INVENTOR(S) : Osburn et al.

It is certified that error appears in the above-identified patent and that said Letters Patent is hereby corrected as shown below:

Column 7,
Line 19, delete "13" and insert -- _ --.

Signed and Sealed this

Twenty-sixth Day of July, 2005

JON W. DUDAS
*Director of the United States Patent and Trademark Office*